United States Patent [19]
Mottate

[11] Patent Number: 4,795,272
[45] Date of Patent: Jan. 3, 1989

[54] SHEET METAL-TYPE ENDLESS RECTILINEAR MOTION ROLLING GUIDE UNIT

[75] Inventor: Tatsuo Mottate, Mitaka, Japan

[73] Assignee: Nippon Thompson Co., Ltd., Tokyo, Japan

[21] Appl. No.: 152,030

[22] Filed: Feb. 3, 1988

[51] Int. Cl.⁴ .............................................. F16C 29/06
[52] U.S. Cl. ....................................... 384/45; 16/102; 104/118
[58] Field of Search ...................... 16/102; 384/43, 44, 384/45; 464/168; 104/118, 119, 242; 105/141

[56] References Cited

U.S. PATENT DOCUMENTS 4,701,057 10/1987 Kashiwabava ..................... 384/45
4,749,284 6/1988 Teramachi ........................ 384/45

Primary Examiner—Robert B. Reeves
Assistant Examiner—Frank H. Williams, Jr.
Attorney, Agent, or Firm—Rogers & Killeen

[57] ABSTRACT

A sheet metal-type endless rectilinear motion rolling guide unit is provided, which unlike the prior art like unit, the structure is simple and compact, yet giving rise to high load resisting capacity and less slide resistance with markedly prolonged operation life. Such an advantage is derived from the employment of ball circulation passageforming spacer member to be assembled with the sliding table, which has a unique configuration and construction.

2 Claims, 4 Drawing Sheets

SHEET METAL-TYPE ENDLESS RECTILINEAR MOTION ROLLING GUIDE UNIT

BACKGROUND OF THE INVENTION

1. Field of the Invention

The present invention relates to an endless rectilinear motion rolling guide unit, which can be easily and simply manufactured from sheet metal material such as steel sheet or the like, yet giving rise to high precision and heavy-load resisting operation.

2. Description of the Prior Art

In the prior art technique, a sheet metal-type endless rectilinear motion rolling guide unit was manufactured such that generally right angle grooves are formed on sheet metal plates from which the unit was assembled but such a guide unit was limited in use only for light load bearing operation with a poor operationability so that it was unable to find any utility in machine tools, precision measurement equipments and like. The only utility was limited to sliding parts of cabinets, desk drawers and other office machines as they require no precision nor heavy-load operating conditions.

Further, in the prior art units made from steel sheet material, synthetic resin material was used for the formation of endless circulation passages for balls so that under such an operating condition where the number of ball circulation strokes per unit of time in the passages is great, the circulation passages were prematurely deformed or damaged to friction generated when the balls circulate therethrough, so that they could not be used with longer operation life.

Furthermore, the configuration each of the ball direction changing passages formed in the side panels of the table member for communicating the load-carrying trackway grooves for balls with the ball return passages which are formed in the sliding table member is shaped as a semicircle, so that the longitudinal dimension of the table, that is, the length thereof in its sliding direction was unavoidably became longer, thus unabling to minimize the dimension as a whole of the unit.

SUMMARY OF THE INVENTION

In light of the recent developments and popularization of NC machine tools, robotic machines and information processing machines, a demand has been on the rise on the market for appearance of endless rectilinear motion rolling guide units which are featured by not only high operationability but also compact size with light weight, thus can be widely used for the above-mentioned purposes.

The object of the present invention is to provide an endless rectilinear motion rolling guide unit featured by light weight-compact size and small sliding resistance in opration.

Further object of the present invention is to provide an endless rectilinear motion rolling guide unit that can be simply and easily manufactured with the use of the least possible number of parts which have been especially designed for efficient and long-life operation.

To meet the above-mentioned objects, therefore, the present invention is featured by the construction specified as follows:

A sheet metal-type endless rectilinear motion rolling guide unit comprising an elongated bed member 1 having a U-shaped cross section and a load carrying trackway groove 1a horizontally extending on each of the opposing inner sidewalls thereof, a rectangular table member 2 having an inverted U-shaped cross section to be associated in a relatively freely slidable relation within the U-shaped cross sectional bore of the bed member and having a load carrying trackway groove 2a in facing relation with said bed-side load carrying trackway groove, a ball circulation passage-forming spacer member securely fitted within the inverted U-shaped cross sectional bore of said table member wherein a pair of ball circulation passage loops are provided in horizontally parallel relation therewithin with their straight passage portions extending longitudinally in the ball circulation passage-forming spacer member, a plurality of rolling members freely rotatably interposed not only within said pair of ball circulation passage loops but also between said bed-side load carrying trackway grooves and said table side load carrying trackway grooves, said ball circulation-forming spacer member consisting of three parts including a pair of outer members each having the same configuration and a thin-walled intermediate guide member adapted to be vertically sandwiched by said pair of outer members and preferably made of a synthetic resin material having wear-resistance greater than that of the material from which the outer member is made from, and said outer members and said intermediate guide member, upon having been assembled together, form the endless circulation passage loops for the balls.

Further, the present invention is featured by the endless circulation passage loops formed in the table member each comprise opposing arcuate ball direction changing portions in the loop, said arcuate ball direction changing portions each including, in the region adjacent and closer to the related load-carrying trackway groove, an arcuate path portion having a smaller curvature than that of the remaining portion.

BRIEF EXPLANATION OF DRAWINGS

FIG. 1 is a perspective view of a sheet steel-type endless rectilinear motion guide unit or ball bearing unit made of a sheet steel material, FIG. 2 is an elevation of the embodiment of FIG. 1

FIG. 3 is a plan view of the embodiment of FIG. 1,

FIG. 4 is a perspective view of ball circulation passage-forming spacer member employed in the present guide unit, FIG. 5 is a perspective view of the intermediate ball guide member employed in the present guide unit, and FIG. 6 is a plan view of a part of the ball circulation passage-forming spacer member according to a second embodiment of the present guide unit.

DESCRIPTION OF THE PREFERRED EMBODIMENTS

Figure 1:
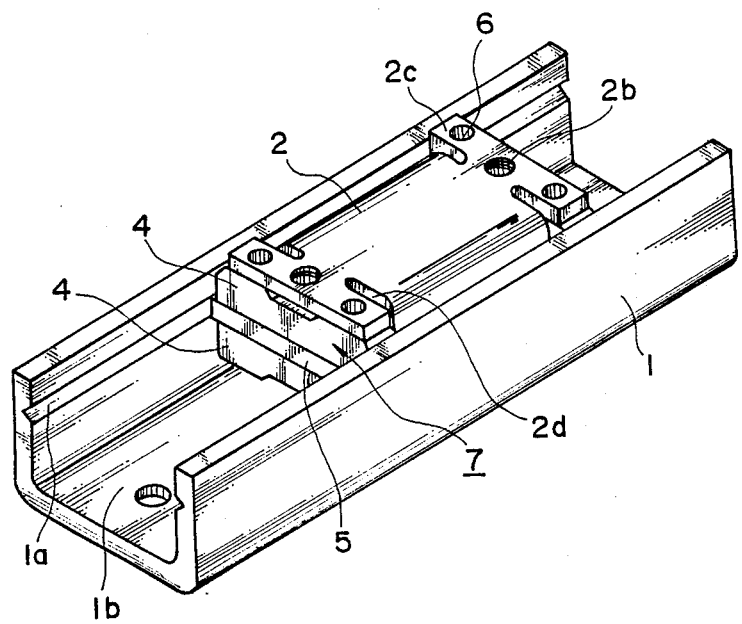
FIGS. 1 to 6, illustrating an embodiment of the present invention.

Referring to FIG. 1, the present endless rectilinear motion rolling guide unit comprises an elongated bed member 1 having a U-shaped cross section and a load carrying trackway groove 1a horizontally extending on each of the opposing inner sidewalls thereof, a rectangular table member 2 having an inverted U-shaped cross section to be associated in a relatively freely slidable fashion within the U-shaped cross sectional bore 2e of the bed member 2 and having a load carrying trackway groove 2a in facing relation with said bed-side load carrying trackway groove 1a, a ball circulation passage-forming spacer member 4 fitted within the inverted U-shaped cross sectional bore 2e of said table member 2 wherein a pair of ball circulation passage loops are provided in horizontally parallel relation therewithin with their straight passage portions extending longitudinally in the ball circulation passage-forming spacer member 7 and a plurality of rolling ball members 3 freely rotatably interposed not only within said pair of ball circulation passage loops but also between said bed-side load carrying trackway grooves 1a and said table-side load carrying trackway grooves 2a.

The rectangular table member 2 is provided at its four corner portions with cutout slots 2d thereby defining a pair of generally T-shaped member 2c at the opposing longitudinal ends of the table member 2 for facilitating not only an external connection of any machine tools or parts therewith but also an internal connection of the ball circulation-forming spacer member 7 for being snugly fitted within the inverted U-shaped cross sectional bore 2e of the table member 2.

The ball circulation-forming spacer member 4 is secured onto the innerwall surface of the inverted U-shaped cross sectional bore 2e of the table member 2 with fastening rivets 6 inserted through holes provided in said T-shaped members.

Any suitable stopper means may be provided at both open ends of the U-shaped cross sectional bore 1b of the bed member 1 to prevent any accidental coming-off of the table member 2 therefrom, though such means are not shown in FIG. 1.

Figure 2:
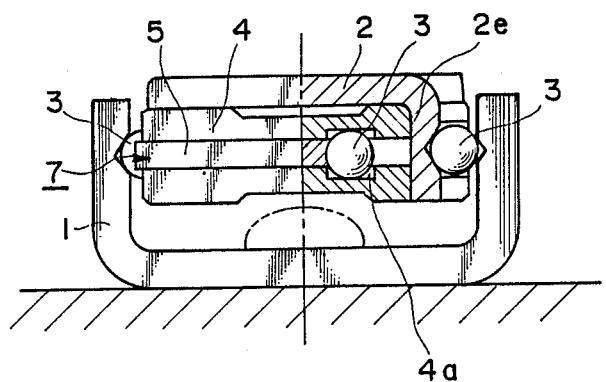

FIG. 2 is an elevation of FIG. 1, where the right half side of the table member 2 is shown in a cross section as it forms a mirror half. The ball circulation-forming spacer member 7 consists of three parts including a pair of outer members 4 each having the same configuration and an intermediate guide member 5 to be sandwiched by said pair of outer members 4 in a superimposed fashion. The outer members 4 each may preferably be made of synthetic resin material, therefore when the outer members 4 are assembled with the intermediate guide member 5 and then secured onto the inverted U-shaped bore 2e of the table member 2, care should be taken not to deform and/or damage each of the outer members 4.

The intermediate guide member 5 serves as a ball guide member and is preferably made of more wear-resisting material than the material of the outer members 4 and it has a generally H-shape with a longitudinally extending partition bank forming a pair of ball guide track-forming surfaces 5a on its both sidewalls thereby not only dividing a pair of ball circulation passage loops from each other but also providing endless circulation passage loops having a markedly improved wear-resistance against the friction generated between the travelling balls and the inner walls of the ball circulation passage loops and smooth guidance of balls therealong as well.

Figure 3:
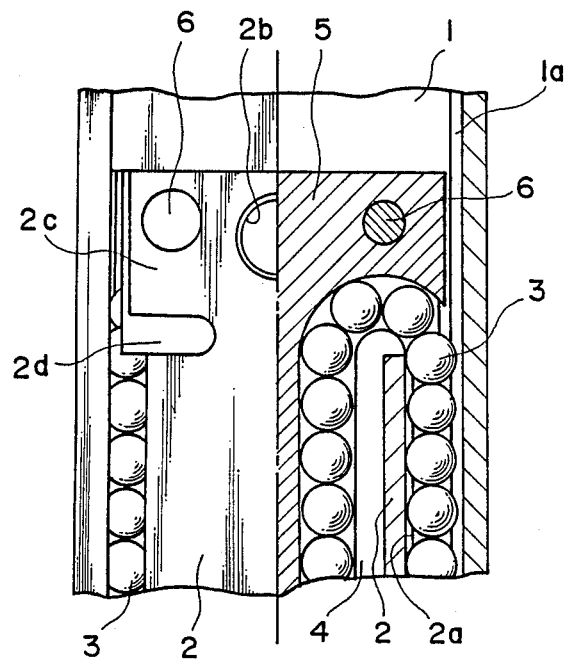

FIG. 3 is a plan view of the rectilinear motion rolling guide unit shown in FIG. 1, wherein a plurality of load carrying balls 3 present between a bed-side load carrying track groove 1a and a table-side load carrying track groove 2a are being guided by the intermediate ball guide member 5 in through an arcuate path from the load-carrying zone to the non-load carrying zone of the ball circulation passage loop.

Figure 4:
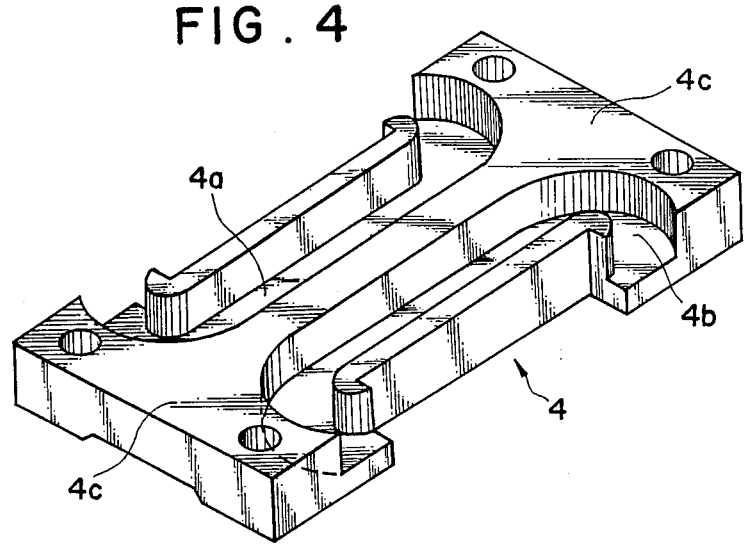

FIG. 4 is a perspective view of the outer member 4 forming a part of the ball circulation passage-forming spacer member 7, wherein the balls 3 that have reached the non-load carrying arcuate direction changing passages from the respectively associated load-carrying ball circulation passages are smoothly guided to the return passage portions 4a of the respective ball circulation passage loops, which portions are directly connected to the outlet ends of the respectively associated ball direction changing passages, which balls in turn are again guided to the related load-carrying trackway grooves 1a and 2a via non-load and second ball direction changing passages 4b which in turn connect the outlet ends of the ball return passage portions 4a with the inlet ends of the load-carrying trackway grooves 1a and 2a, respectively.

Figure 5:
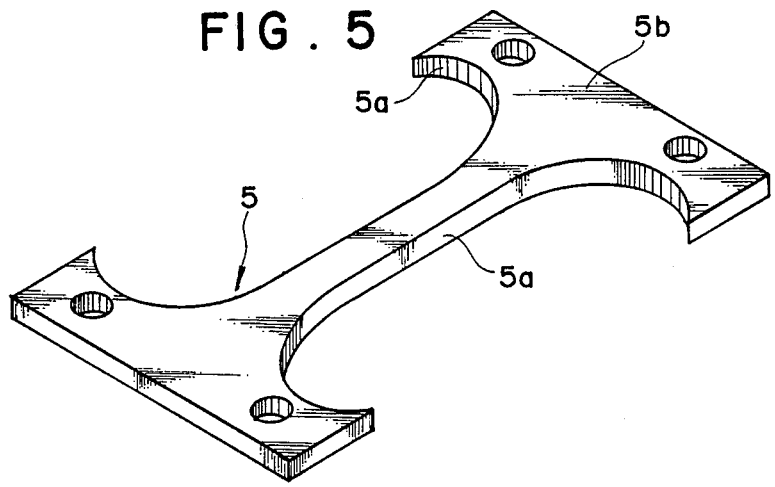

Referring to FIG. 5 showing a perspective view of the intermediate guide member 5, a guide track-forming, longitudinally extending partition bank 5a has the same passage pattern as that of the ball circulation passage loops formed in each of the outer members 4, thus alleviating the friction caused by centrifugal force of the circulating balls with under the contact with the longitudinally extending wall surfaces of said partition bank, when the balls 3 are travelling through and along the non-load carrying portions of the ball circulation passage loops.

Figure 6:
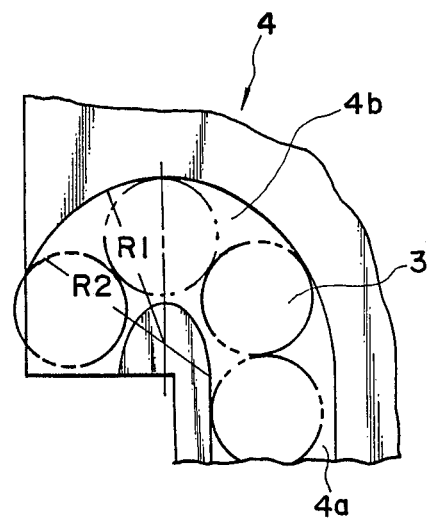

FIG. 6 illustrates a modified pattern configuration of the ball direction changing passage formed in either of the outer member 4 or the associated intermediate guide member according to the second embodiment of the present invention.

The prior art ball direction changing passage has a semicircular path for the pattern of ball direction change passage, thus inevitably requiring a longer distance of the pattern in the direction the table slidably moves.

To solve this problem, according to this embodiment, the radius of curvature $R_2$ of the portion of ball direction changing passage that is adjacent and closer to the connected load-carrying trackway groove is made greater than that $R_1$ of the other portion apart further therefrom so as to establish the following relation:

$$R_2 > R_1$$

Thus, the balls rolling along and through the region of direction changing passage, adjacent and closer to the load-carrying trackway grooves in each of the ball circulation passage loop can moderately change their travelling directions to form a curved path, whereas in the other region of the direction changing passage, further remote from the related load-carrying trackway grooves, the balls make their direction changing with an arcuate path having a greater curvature, so that the balls 3 can smoothly move even at the transit region between the load-carrying zone and non-load-carrying zone of the ball circulation passage loop, yet enabling to minimize the longitudinal length of the sliding table 2.

The above-mentioned pattern configuration of the ball direction changing passage can similarly be applied to the configuration of the corresponding part of the guide-track forming longitudinally extending partition bank 5a of the intermediate guide member 5.

It should be appreciated that the features of the present invention so far having been explained referring to the attached drawings may also be similarly applied to not only the endless rectilinear motion rolling guide units or ball bearing units exemplified heretofore but also to any other similar bearing and guide units.

The technical effects created by the present endless rectilinear motion rolling guide unit can be summarized as follows:

(1) Wear resistance of the endless ball circulation passages provided in the present rectilinear motion guide unit can be markedly enhanced, thus solving a problem of short operation life inherent in the unit of this kind, (2) the present unit can be manufactured with the least possible member of parts so that the manufacturing costs involved can be minimized, and (3) with the use of the particular parts and design, the present unit is featured by a smaller sliding resistance in operation and further can be made in a compact size with a light weight.

What is claimed is:

1. A sheet metal-type endless rectilinear motion rolling guide unit comprising an elongated bed member 1 having a U-shaped cross section and a load carrying trackway groove 1a horizontally extending on each of the opposing inner sidewalls thereof, a rectangular table member 2 having an inverted U-shaped cross section to be associated in a relatively freely slidable relation within the U-shaped cross sectional bore of the bed member and having a load carrying trackway groove 2a in facing relation with said bed-side load carrying trackway groove, a ball circulation passage-forming spacer member securely fitted within the inverted U-shaped cross sectional bore of said table member wherein a pair of ball circulation passage loops are provided in horizontally parallel relation therewithin with their straight passage portions extending longitudinally in the ball circulation passage-forming spacer member, a plurality of rolling members freely rotatably interposed not only within said pair of ball circulation passage loops but also between said bed-side load carrying trackway grooves and said table side load carrying trackway grooves, said ball circulation-forming spacer member consisting of three parts including a pair of outer members each having the same configuration and a thin-walled intermediate guide member adapted to be vertically sandwiched by said pair of outer members and preferably made of a synthetic resin material having wear-resistance greater than that of the material from which the outer member is made from, and said outer members and said intermediate guide member, upon having been assembled together, form the endless circulation passage loops for the balls.

2. The sheet metal-type endless rectilinear motion rolling guide unit as claimed in the claim 1, wherein the endless circulation passage loops formed in the table member each comprise opposing arcuate ball direction changing portions in the loop, said arcuate ball direction changing portions each including, in the region adjacent and closer to the related load-carrying trackway groove, an arcuate path portion having a smaller curvature than that of the remaining portion.

* * * * *